Nov. 1, 1960 E. MITCHELL 2,958,314
INTERNAL COMBUSTION ENGINE
Filed Oct. 28, 1958 2 Sheets-Sheet 2

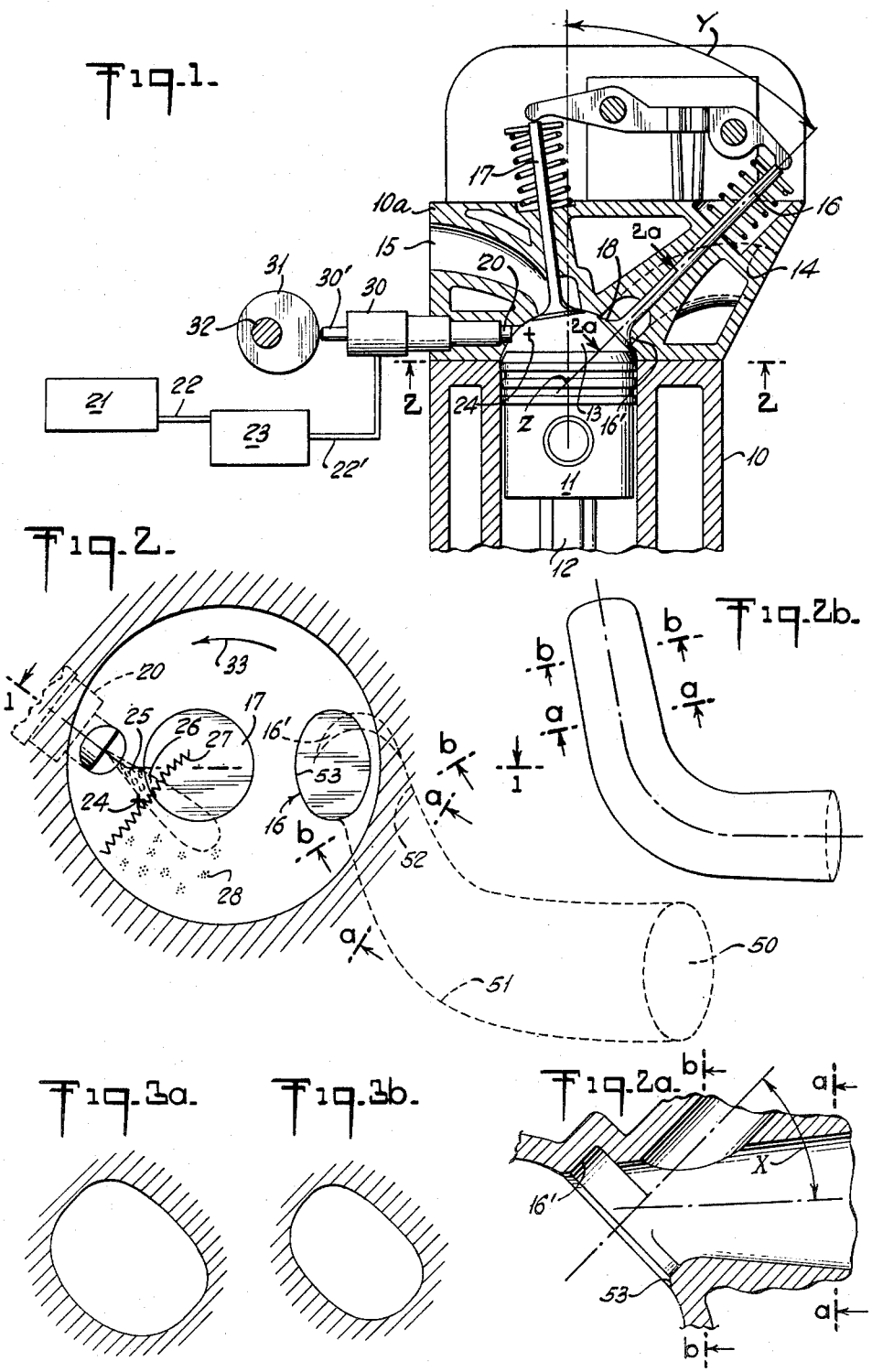

United States Patent Office 2,958,314
Patented Nov. 1, 1960

2,958,314

INTERNAL COMBUSTION ENGINE

Edward Mitchell, Fishkill, N.Y., assignor to Texaco Inc., a corporation of Delaware Filed Oct. 28, 1958, Ser. No. 770,230

8 Claims. (Cl. 123—32)

This invention relates generally to an internal combustion engine and method of operating the same as disclosed and claimed in U.S. Patent No. 2,484,009, issued October 11, 1949, to Everett M. Barber, and more particularly is concerned with such an operating engine having a dome combustion chamber and improved directing intake means therefor as disclosed and claimed in the copending and coassigned application for patent for an Internal Combustion Engine by James F. Kincaid.

In accordance with the disclosure in the above-cited patent, an improved combustion process is carried out within an internal combustion engine in a manner such that knocking will not occur, irrespective of the octane or cetane number of the fuel employed or the compression ratio or the fuel-air mixture ratio used. This is accomplished by preventing fuel from mixing with that portion of the air within the combustion space of an engine cylinder which normally would form the combustible so-called "end gases" by reducing the residence time of combustible mixture in the cylinder to the extent that there is insufficient time for spontaneous ignition to occur prior to normal combustion, and by providing positive ignition means.

In the preferred embodiment of the patented invention, air unmixed with fuel or air containing insufficient fuel to support combustion is introduced into and caused to swirl around the engine combustion chamber at a controlled rate of swirl with respect to the engine speed. Fuel under pressure is injected into the compressed swirling air or fuel-air mixture during the latter part of the compression stroke and the early part of the power stroke of each engine cycle to form an ignitable fuel-air mixture adjacent the point of fuel ignition. The increment and direction of fuel injected during the period from injection to ignition is so controlled that the fuel mixes with only a localized portion of the air within the engine combustion chamber to form a localized fuel-air mixture which is ignited immediately by spark or other suitable means and establishes a flame front.

The injection of fuel is continued during the balance of the injection period into a narrow zone or zones of the combustion chamber immediately in advance of the flame front. The fuel-air mixture formed therefrom is confined on its upstream side by air swirling toward it and containing little or no vaporized fuel and so is incombustible. On the downstream side, the mixture is confined by products of combustion traveling away from the flame front at the edge of the mixture, where burning occurs substantially as fast as a combustible mixture is formed, so that combustion is confined to the leading edge of the mixture. Thus, during each cycle of the engine operation, combustible mixture is formed and consumed progressively in a localized area in the combustion chamber. As a result, few or no combustible "end gases" are permitted to exist, and should they become existent, are not exposed to combustion chamber pressure and temperature for the time required for spontaneous ignition to occur. Consequently, knocking is inhibited even with the use of fuels of low anti-knock value at high compression ratios.

With respect to four stroke cycle engines, the basic Barber patent discloses the use of a cylindrical disk shaped combustion chamber with a directing intake passage and port having a shrouded poppet type valve to provide the required air swirl, with the axis of the valve being parallel to the axis of the engine cylinder.

It has been found that this arrangement is not the most efficient means for producing air swirl, and necessitates the use of a relatively small size intake valve and passage in order to obtain the desired air swirl rate, with the result that the high speed volumetric efficiency of the engine is poor.

In addition, the disc combustion chamber does not have the most favorable surface to volume ratio and heat losses from the chamber are unnecessarily high. Also, by the nature of the patented construction, with a disk combustion chamber, the sources of fuel injection and ignition must be located near the cylinder circumference in the region of the highest velocity of swirling air, causing ignition of the fuel-air mixture to be less reliable at the extremes of the speed and load conditions as compared with the case wherein they are located in a region of lower velocity of swirling air. This ignition difficulty is caused by the fact that the fuel spray is deflected toward the ignition source by the high velocity swirling air (the amount of deflection, and hence, the mixture strength at the spark gap being a function of air swirl rate, engine speed, the radial location of the nozzle and spark plug in the combustion chamber, and the amount of fuel injected), and the space relationship of the source of fuel injection and spark ignition not being located for optimum ignition, along with spray shape.

Accordingly, it is an object of the present invention to obtain an improved non-knocking type of internal combustion engine.

It is another object of the invention to obtain increased high speed volumetric efficiency in non-knocking engine operation, using the same or higher air swirl rate, and with improved ignition of the fuel-air mixture over wider speed and load ranges.

Another object of the invention is to provide for better thermal efficiency of a non-knocking internal combustion engine by reducing heat losses in the combustion chamber and for ignition and combustion of leaner fuel-air mixtures more efficiently.

Still another object of the invention is to provide for improved non-knocking internal combustion engine operation by improving the location relationship of the fuel injection and ignition means with respect to the fuel spray shape, in a dome combustion chamber.

And another object of the invention is to provide for improved non-knocking internal combustion engine operation using a dome combustion chamber having a canted intake valve and more efficient directing inlet means for producing air swirl in the engine cylinder, together with more reliable ignition.

These and other objects of invention will be apparent from the following description when read in conjunction with the accompanying drawings wherein:

Fig. 1 is a diagrammatic illustration of the improved construction of an engine cylinder with several of its operating appurtenances;

Fig. 2 is a sectional diagrammatic view taken in the direction of the line 2—2 of Fig. 1, illustrating the type of non-knocking combustion which occurs in the internal combustion engine;

Fig. 2a is a view showing the angularity of the intersection of the center line at the end of the intake passage with the axis of the intake valve, taken along line 2a—2a, Fig. 1;

Fig. 2b is a projection in the plane through the center line of the intake passage between sections a—a and b—b;

Figs. 3a and 3b are respectively the cross sections of the intake passage taken at the lines a—a and b—b of Fig. 2;

Figure 4A:
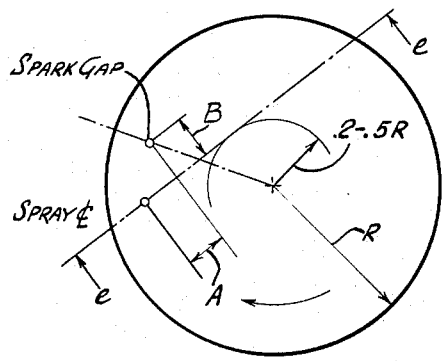
Figure 4B:
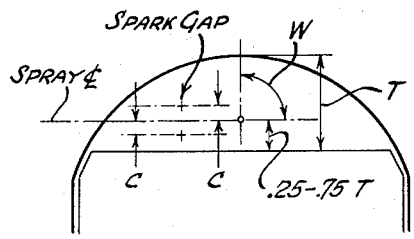
Figure 5:
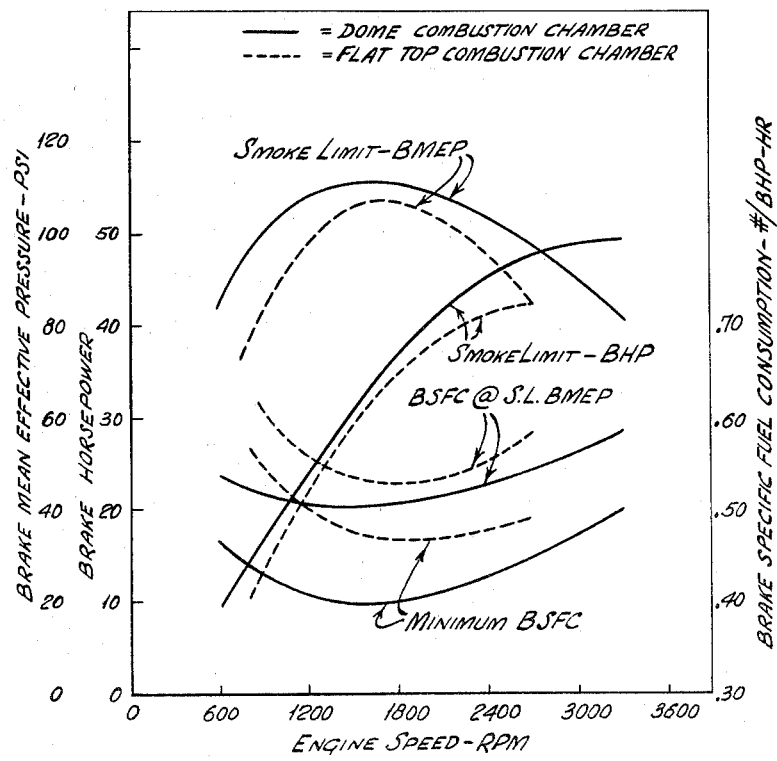

Figs. 4a and 4b are plan and elevation views respectively of an engine cylinder disclosing the limits of the location of the fuel injection means and the limits of the position of the ignition means with respect to the fuel injection means for the practice of the invention, the elevation view being taken along line e—e of Fig. 4a; and Fig. 5 is a graph illustrating certain performance characteristics of the engine of the present invention in comparison with those from the same size engine constructed with the disk combustion chamber as disclosed in the above cited Barber patent, both operating on the patented non-knocking combustion process under similar operating conditions with the ignition means located as disclosed on Figs. 4a and 4b.

The present invention is distinguishable by its dome combustion chamber having improved directing intake means, giving increased air swirl efficiency, higher air swirl rate and/or better high speed volumetric efficiency, a more compact combustion chamber with a lower surface-volume ratio, thereby increasing thermal efficiency, and with improved ignition characteristics.

Referring to Fig. 1, the engine cylinder is indicated at 10, with piston 11 at top dead center position, and connecting rod 12, which is joined to the usual crankshaft, not shown. The cylinder head 10a, in combination with the piston, defines combustion chamber 13. The cylinder head is equipped with intake and exhaust passages 14 and 15 respectively, with port openings controlled by an inclined or canted intake valve 16 with shroud 16' thereon, and an exhaust valve 17. The intake passage 14 has the same tapering construction as that disclosed in co-assigned U.S. Patent No. 2,768,617, issued to W. T. Tierney, Jr. and J. F. Kincaid on October 30, 1956, and is in communication with an air intake pipe or manifold, which may contain a customary air filter, both not shown; and communicating with the exhaust passage 15 is an exhaust pipe which may contain a muffler, both not shown.

As disclosed in the copending application for patent by J. F. Kincaid, Serial No. 770,192, filed October 28, 1958, the intake passage 14 includes a straight inlet portion or end 50 which is circular in cross section, an elbow section or curved transition portion 51, which can be described in a simplified manner as about a 60° bend in the vertical plane and about a 90° bend in the horizontal plane, a straight intermediate portion 52 which is generally tapered in vertical profile with its center line disposed at an angle with respect to the axis of the intake valve (see Fig. 2a) and a discharge portion 53.

The cross section of the intermediate portion 52 tapers from a generally lopsided circular or somewhat semicircular, semi-elliptical shape at section a—a, as shown in Fig. 3a to the essentially elliptical shape at section b—b, as shown in Fig. 3b. The inlet and intermediate portions are smoothly joined by the transition portion or elbow section 51. The intermediate portion of the inlet passage leads to the intake port through the discharge portion 53 which smoothly blends from the elliptical section at b—b to the circular end of the passage or port opening 18, in the top or roof of the dome combustion chamber, which opening is disposed at an angle to the center line of the passage extending from the intermediate portion into and through the discharge portion. Thus, a smooth walled air flow passage having a gradually decreasing cross section as it approaches the combustion chamber is provided.

The important features of this construction are as follows:

(1) The center line of the intake passage at its discharge or port end is at an angle of about 30° to 60° with the axis of the intake valve, as indicated at X, Fig. 2a;

(2) The plane defined by the intake valve axis and the center line of the straight intermediate portion of the intake passage at its discharge end is substantially perpendicular to the plane defined by this valve axis and the cylinder axis; and (3) The axis of the intake valve 16 is inclined with respect to the cylinder axis at an angle of 30° to 60°, with the preferred angle being about 45°, as indicated at Y, Fig. 1, and passes through the center of curvature of the top or roof of the dome combustion chamber, indicated at Z, Fig. 1, within the limits of 15% or less of the cylinder bore, and so may be along an extension of a radius of the dome combustion chamber.

These characteristics of the intake passage in combination with the shroud 16' on the intake valve 16, positioned as shown, serve to direct the incoming air in a tangential direction to produce swirling movement of the air within the combustion space as indicated by the arrow 33, Fig. 2.

The size of the intake passage and its port is a function of the displacement and bore-stroke ratio of the cylinder and the air swirl rate desired. Because of the higher swirl efficiency of this design, viz., a greater percentage of the air velocity through the valve becoming apparent as swirl velocity in the cylinder, a larger intake passage and port can be used than was possible with the previous Barber teachings to obtain the required air swirl rate (a minimum of about 6 times engine r.p.m.), with improved high speed volumetric efficiency; or if desired, a smaller size intake passage and port can be used to give higher air swirl rate and improved thermal efficiency without improving volumetric efficiency.

The inherent advantages of the intake passage construction patented by Tierney and Kincaid have been augmented by the inclined intake valve construction to improve the air swirl efficiency because the intersection of the center line of the straight intermediate portion of the intake passage with the axis of the intake valve or the point of entry of air into the cylinder, occurs at a greater radial distance from the cylinder axis than is the case in the cylindrical disk combustion chamber and approaches a tangential inlet.

The cylinder head surface of the combustion chamber i.e. the roof, is arcuate and preferably a spherical segment or cap of a spherical surface, the center of curvature of which is located preferably on the axis of the cylinder bore, with the radius of curvature ranging from about 40% to 65% of the cylinder bore. However, deviations from a true spherical surface, which are caused by the presence of valves and the fuel nozzle and spark plug ports, or other minor variations which may be necessary from a structural or cooling standpoint, or the nonsymmetry of the spherical surface with respect to the cylinder bore caused by the radius of curvature not being centered on the cylinder axis, are not considered detrimental or departing from the spirit of the invention.

Since a dome, i.e. an arcuate, chamber is more compact than the cylindrical disk combustion chamber disclosed in the cited Barber patent, there is a lower surface to volume ratio and so a reduction in heat loss, resulting in higher thermal efficiency; and with the smaller combustion chamber, the mixing of fuel and air is easier and faster because of the compactness.

Also, the effective swirl rate during combustion has become higher than the induced swirl because the air has been squeezed into a smaller rotating mass, making the radius of gyration of the air mass smaller.

A fuel injection means 20, shown diagrammatically, extends through an opening in the combustion chamber roof, and as disclosed, is directed to discharge into the combustion space downstream and generally tangential to the circular direction of air swirl. Fuel from a suitable source of supply, such as tank 21, is drawn through line 22 by the usual engine driven fuel pump 23, and forced under high pressure through line 22' to the injection means 20.

Suitable means for regulating the quantity of fuel injected and the time of fuel injection in relation to the engine cycle are employed. As illustrated, the fuel injection means 20 is equipped with a valve 30 having a valve stem 30' operated by cam 31 carried by cam shaft 32, which is interconnected to be driven by the engine in some known manner. Cam 31 may be adjusted relative to the piston stroke to control the time of fuel injection or injection advance, and adjusted relative to the valve stem to control the length of time of opening of the valve 30, to control the rate of fuel injection and the amount of fuel injected on each stroke respectively. As controls for this purpose are well known, no further illustration is thought necessary.

Referring to Figs. 4a and 4b, the fuel injection means 20 is disposed in the combustion chamber so that the fuel is injected generally downstream with respect to the air motion in the combustion chamber. The spray center line, under static conditions, is tangent to a cylinder, which is coaxial to the engine cylinder, and has a diameter of from 20% to 50% of the engine cylinder bore.

The acute angle formed at the intersection of the spray axis and the element of the coaxial cylinder to which it is tangent is indicated at W, Fig. 4b, and varies between 75 and 90 degrees, with the point of intersection on the cylindrical element being located from the intersection of this element with the crown of the piston at top dead center position at a distance ranging from 25% to 75% of the distance measured along the cylindrical element between the roof of the combustion chamber and the piston crown at top dead center position, as indicated at T, Fig. 4b.

The orifice of the injection means is located substantially at the point of intersection of the axis of the fuel injection means with the combustion chamber surface.

A spark plug 24, or other means of positive ignition, also extends into the engine combustion chamber and is located therein downstream of the fuel injection means with respect to the air swirl motion. The spark plug is connected externally to means for producing an electrical discharge across the spark gap at an appropriate time in the cycle, these means being relatively well known in the art and therefore are not shown here. The arrangement for providing proper spark timing as disclosed in co-assigned U.S. Patent No. 2,768,615, issued to C. F. Taylor and Blake Reynolds on October 30, 1956, wherein the timing of the spark discharge is regulated by the beginning of injection, is particularly suitable for the practice of this invention.

With my improved construction, the injection and ignition means, 20 and 24 respectively, enter the dome combustion chamber through the arcuate roof, rather than through the cylinder wall of the combustion chamber, as in the case with the cylindrical disk shaped combustion chamber, and so, the sources of fuel injection and ignition are at a smaller radius of the combustion chamber. Thus, for engines having the same bore and under conditions of the same air swirl rate, the air velocity at the sources of injection and ignition will be less. With the present invention, the distortion of the spray shape therefore will be less and ignition will be more reliable.

The spark gap of spark plug 24 is spaced from the injection means 20 a sufficient distance to permit the formation of an ignitable mixture during the intervening travel of the injected fuel, while at the same time being sufficiently close to injection means 20 to prevent the accumulation within the combustion space of any substantial amount of combustible mixture prior to ignition.

The spark gap is located with respect to the nozzle as disclosed in the co-assigned and copending application for patent, Serial No. 670,227, filed on July 5, 1957, by E. M. Barber and C. W. Davis.

The spark gap should be spaced inwardly of the arcuate surface of the dome combustion chamber in a plane perpendicular to the spray center line and spaced inwardly from the orifice of the fuel injector nozzle a distance indicated as A, Fig. 4a, and thence in this plane in the direction of and parallel to the direction of air motion in the combustion chamber a distance from this center line indicated as B, Fig. 4a; and thence still in the same plane perpendicular to the distance indicated as B, a distance indicated as C, Fig. 4b.

The inward spacing of the plane along the spray center line from the nozzle orifice indicated as A in Fig. 4a, has the range limits of from 0.35" to 0.70"; the downstream distance in this plane indicated as B in Fig. 4a, has the limits of from 0.10" to 0.40"; and the further spacing indicated as C, Fig. 4b, has the range limits of from 0 (when on the center line of the spray) to 0.25" on either side of the spray center line. Determination of the location of the spark gap with respect to the injection nozzle orifice within the limits of A, B and C as set forth above will result in its proper positioning to achieve the results of our invention.

In operation, a charge of air unmixed with fuel, or containing less than that amount of fuel which will support combustion, is drawn into the cylinder on the suction stroke of the piston 11. This air, of dilute fuel-air mixture is then compressed on the compression stroke of the piston. The swirling movement imparted to the air during induction continues throughout compression and combustion because of inertia, increasing somewhat during the period when the piston is near top dead center position, because of the smaller radius of gyration and conservation of momentum.

Near and generally somewhat before the position of top dead center of piston travel, an increment of fuel is injected from the fuel injection means 20, tangentially into the swirling air, to bring the edge of the spray close to the spark gap of spark plug 24. The spray from injection means 20 has a narrow cone angle varying between 5° and 25° and is such as to uniformly impregnate the swirling air as the latter passes slightly beyond the point of fuel injection. At the outlet of the injection means, the spray is apparently highly atomized, as indicated at 25, so that it begins to vaporize and mix with the swirling air to form a combustible mixture at the spark gap. As evident from Fig. 2, the fuel is directed to one side of the combustion space. As the spray moves outwardly to the area indicated by the numeral 26, the swirling air causes the fuel to be distributed throughout the air charge, resulting in a uniform fuel-air mixture being created. The zones 25, 26 therefore constitute the region of impregnation of the air with the fuel, and the region of formation of a combustible fuel-air mixture.

Just as or very shortly after the first increment of injected fuel reaches the spark gap between the electrodes of spark plug 24, by which time it has formed an ignitable fuel-air mixture with the swirling air, a spark is caused to occur between the electrodes of plug 24 igniting this mixture and establishing a flame front as indicated generally at 27. As shown in Figs. 1 and 2, the positioning of injection means 20 and the fuel spray produced by this means are such that the spark gap between the electrodes of the plug are within the ignitable fuel-air mixture, whereby ignition of this first increment of injected fuel is insured.

With such an arrangement, the fuel-air mixture is ignited almost as soon as it is formed, before an opportunity is afforded for the injected fuel to mix with air throughout any substantial extent of the combustion space, and before sufficient time has elapsed to permit spontaneous ignition. The result is that knock cannot occur regardless of the octane or cetane number of the fuel. A combustible mixture is produced only within a localized zone of the combustion space adjacent the plug 24, and this mixture is surrounded by air or an incombustible lean mixture on the upstream side and by exhaust products indicated generally at 28 on the downstream side. The established flame front 27 tends to travel toward the injection means 20 but the high velocity swirling movement of the air and other gases within the combustion space, coupled with the incombustible fuel rich mixture near the injection means, tend to counteract actual relative movement of the flame front with respect to the cylinder wall, fuel nozzle and ignition means.

During continuance of that portion of the compression or power stroke or both which falls within the period of fuel injection, additional fuel is injected toward the flame front 27 and is mixed with fresh quantities of the swirling air to form combustible mixture which is ignited and burned as it reaches the flame front. It will be noted that the combustion of this additional fuel-air mixture takes place almost as rapidly as formed, and that no opportunity is given for unburned fuel to become disseminated widely through the combustion space. The first portions of fuel-air mixture, which are burned rapidly at the flame front, become incombustible exhaust gases, which continue the swirling movement around the cylinder. Consequently, even if the period of fuel injection is continued until substantially all of the air within the cylinder has been mixed with fuel and burned, as is the case for full load operation, the last volume of combustible mixture formed is still bound by incombustible exhaust gases. When the period of fuel injection is terminated prior to consumption of all the air for part load operation, the last combustible mixture formed is confined on the front side of its swirling movement by the exhaust gases and on the rear side by an incombustible mixture of air. Thus, combustion to develop the power required on each stroke is accomplished while avoiding the formation of highly heated end gases of combustible fuel-air mixture that could ignite spontaneously and cause knock. Also, since the fuel is not injected until immediately prior to combustion, there is no problem of uncontrolled pre-ignition.

In the preferred embodiment of this invention, air only is drawn into the engine cylinder, the amount of air taken in per cycle being unregulated and essentially constant for all conditions of load and speed. As noted above, load control of the engine is accomplished entirely by regulating the amount of fuel injected, the preferred control of injection being such that the rate of injection is essentially constant with quantity variation being accomplished through regulation of injection duration.

Although the foregoing disclosure has been drawn specifically to a spark ignition set up for the positive ignition of the initially formed combustible fuel-air mixture, other positive ignition means can be used to ignite the first increment of injected fuel as soon as a combustible fuel-air mixture is formed therefrom. For example, a glow plug or glow wire can be substituted for the disclosed spark plug. Ordinarily, spark ignition is preferred as providing more efficient operation.

The improvements in power and fuel economy obtained by operating an engine of the patented non-knocking type, in accordance with this invention as compared with the results obtained with the cylindrical disk type combustion chamber, are shown on Fig. 5, wherein the solid lines represent engine performance with the present invention and the broken lines the performance from the prior art teachings. It can be seen that the present invention gives greater power output over a wider speed range with reduced fuel consumption.

Thus there has been shown and described an improved non-knocking internal combustion engine where better performance can be obtained through the use of a combustion chamber and intake passage arrangement that results in higher air swirl efficiency, high air swirl rate and/or volumetric efficiency, better combustion, reduced heat losses, higher thermal efficiency and more reliable ignition characteristics.

Obviously, many modifications and variations of the invention as hereinbefore set forth, may be made without departing from the spirit and scope thereof, and therefore, only such limitations should be imposed as are indicated in the appended claims.

I claim:

1. The combination in an internal combustion engine comprising a cylinder, a cylinder head and a piston operating in said cylinder and defining therein with said head a combustion chamber having a roof of arcuate cross section, intake means for introducing an oxidizing gas such as air into said combustion chamber and for imparting a high velocity swirl thereto, fuel injection means carried by said cylinder head for providing fuel to said combustion chamber whereby a portion of the first increment of injected fuel forms with a localized portion of the swirling air in said combustion chamber an ignitable fuel-air mixture, ignition means mounted in said cylinder head extending into said combustion chamber, means coordinated with engine operation for controlling the start of fuel injection during the latter part of the compression stroke of said piston, means synchronized with engine operation for providing energy to said ignition means to initiate combustion and establish a flame front, and means for continuing the injection of fuel thereafter so as to form additional fuel-air mixture in advance of said flame front for burning substantially as rapidly as formed to provide the power required on each cycle, said ignition means extending into said combustion chamber being positioned in a plane which is normal to the spray center line (under static conditions) of said fuel injection means and located between 0.35" and 0.70" from the orifice thereof and in this plane in the direction of swirling movement a distance between 0.10" and 0.40" from said spray center line, and in the same plane at right angles to this last mentioned distance not more than 0.25", said fuel injection means being of the type comprising a nozzle which produces a narrow angle penetrating spray, said angle varying between 5° and 25°, said intake means including an intake passage having an outlet end terminating as the intake port of said combustion chamber in the roof thereof and having its center line at said outlet end extending therethrough and into said combustion chamber and a smoothly decreasing cross section in the direction of flow changing gradually in shape from that of a generally lopsided circle to generally elliptical of increasing flatness, and a poppet valve adapted to be reciprocated into closed and opened relationship with said intake port, the plane defined by said center line at said outlet end of said passage and the valve axis being substantially perpendicular to the plane defined by said valve axis and the cylinder axis, said valve axis intersecting said cylinder axis at an angle varying between 30° and 60°, the passage center line intersecting said valve axis at said intake port at an angle varying between 30° and 60°, the angle of intersection between said valve axis and said cylinder axis occurring at the radius of curvature of said arcuate cross section within the limits of 15% of the cylinder bore, said arcuate cross section having a radius of curvature ranging from 40% to 65% of the cylinder bore, the center line of said spray from said fuel injection means being directed tangent to a cylinder coaxial with the engine cylinder and having a radius 0.2 to 0.5 that of the cylinder bore, and with the acute angle of intersection between said spray center line and the element of tangency of the coaxial cylinder varying between 75° and 90°.

2. In the combination as defined in claim 1, the intersection of said spray center line and the cylindrical element of tangency being located from the intersection of said element of tangency and the piston crown at top dead center position a distance ranging from 25% to 75% of the distance measured along said cylindrical element between said roof of said combustion chamber and said piston crown at top dead center position.

3. In an internal combustion engine, a cylinder with a piston operating therein, a head for said cylinder having an arcuate depression therein for providing a combustion chamber with a dome shape roof, the radius of curvature of said roof of said combustion chamber ranging from 40% to 65% of the cylinder bore, means for introducing air into said combustion chamber and for imparting a high velocity swirl thereto, injection means carried by said cylinder head for injecting fuel into said combustion chamber so that an increment of injected fuel forms with a localized portion of swirling air therein an ignitable fuel-air mixture, said last mentioned means being positioned to inject fuel into said combustion chamber in the direction of air swirl, a spark ignition device mounted in said cylinder head having its electrodes projecting within said combustion chamber and downstream of said injection means, means coordinated with engine operation for controlling the start of fuel injection during the latter part of the compression stroke of said piston, means synchronized with engine operation for producing a spark of igniting intensity at the spark gap between said electrodes to initiate combustion of said fuel-air mixture formed from said increment of injected fuel and establish a flame front, and means for controlling the rate and duration of fuel injection following ignition to form in advance of said flame front additional quantities of fuel-air mixture for burning to provide the power required on each cycle, said injection means being of the type which produces a narrow angle penetrating fuel spray, said spark gap being located in a plane normal to the center line of fuel spray (under static conditions) from said injection means and spaced from the orifice of said injection means not less than 0.35" and not more than 0.70", and in this plane in the direction of and parallel to the air motion in the combustion chamber at a distance of at least 0.10" and not more than 0.40" from said fuel spray center line and at right angles to this distance and in the same plane within the limits of 0.0" to 0.25", said means for introducing air into said combustion chamber comprising a tubular air flow passage with an outlet ending as the intake port in said cylinder head and having the outlet center line extending through said passage and port and into said combustion space and a cross section smoothly decreasing in area in the direction of flow while varying in shape from circular to lopsided circular to generally elliptical, a poppet valve adapted to be reciprocated into closed and opened relationship with said outlet end of said intake passage and having its axis inclined to the cylinder axis, the plane defined by said outlet center line and the valve axis being substantially normal to the plane defined by said valve axis and said cylinder axis, said center line of said fuel spray being tangent to a cylinder having a radius from 0.2 to 0.5 that of the engine cylinder and coaxial thereto and intersecting an element of the coaxial cylinder at an acute angle varying from 75° to 90°.

4. In the engine as defined in claim 3, the intersection of said spray center line with the coaxial cylinder element measured along the element of tangency from its intersection with the crown of said piston at top dead center position being not less than 25% and not more than 75% of the distance between the crown of said piston at top dead center position and said dome shape roof of said combustion chamber, said dome shape roof being arcuate in cross section.

5. In the engine as defined in claim 4, the axis of said poppet valve being inclined at an angle varying from 30° to 60° to said cylinder axis and intersecting the radius of curvature of said roof of said combustion chamber within the limits of 15% of the cylinder bore, the center line at the outlet end of said intake passage intersecting said axis of said poppet valve at said intake port at an acute angle varying between 30° and 60°.

6. The combination in an internal combustion engine comprising a cylinder having a piston operating therein, a cylinder head for said cylinder defining a combustion space therewith, said combustion space having an arcuate cross section roof with a radius of curvature ranging from 40% to 65% of the cylinder bore, intake means including an intake passage ending as the intake port and a shrouded intake valve therefor for introducing air into said combustion space and for imparting a high velocity swirl thereto, fuel injection means carried by said cylinder head for providing fuel to said combustion space whereby a portion of the first increment of injected fuel forms with a localized portion of the swirling air in said cylinder a combustible fuel-air mixture, a positive ignition device mounted in said cylinder head and extending into said combustion space sufficiently close to said fuel injection means and the fuel injected therefrom so that said combustible fuel-air mixture formed from said localized portion of said swirling air with said first increment of injected fuel envelopes said ignition device extending into said combustion space substantially as soon as said combustible fuel-air mixture is formed, means coordinated with engine operation for controlling the start of injection of fuel from said fuel injection means during the latter part of the compression stroke of said piston, means synchronized with engine operation for providing energy to said ignition device at the time said combustible fuel-air mixture reaches said ignition device to initiate combustion and establish a flame front adjacent said ignition device, and means for continuing the injection of fuel following ignition to impregnate shortly in advance of said flame front additional quantities of swirling air to form progressively additional combustible fuel-air mixture immediately in advance thereof for burning substantially as rapidly as formed to provide the power required on each cycle whereby the formation of end gases which ignite spontaneously and produce knock is prevented, said ignition device extending into said combustion space being positioned in a plane which is normal to the center line of the fuel spray from said fuel injection means and located between 0.35" and 0.70" from the orifice thereof and in this plane in the direction of swirling movement a distance between 0.10" and 0.40" from said spray center line, and in the same plane at right angles to this last mentioned distance not more than 0.25", said fuel injection means being of the type comprising a nozzle which produces a narrow angle penetrating spray, said angle varying between 5° and 25°, said center line of said spray being directed tangent to a cylinder coaxial with the engine cylinder bore and having a radius 0.2 to 0.5 that of said bore and being directed so that the acute angle of intersection between said axis and the element of tangency of the coaxial cylinder varies between 75° and 95°, the point of intersection being located on the coaxial cylinder element of tangency a distance ranging from 25% to 75% that of the distance along said coaxial cylinder element between the combustion chamber roof and piston crown at top dead center piston position, the center line of the outlet end of said intake passage extending through said intake port into said combustion chamber with the intersection of said center line and the axis of said intake valve varying between 30° and 60°, the plane defined by the center line at said outlet end of said intake passage and the valve axis being normal substantially to the plane defined by said valve axis and the cylinder axis, and a smoothly decreasing cross section in the direction of flow changing gradually in shape from that of a generally lopsided circle to generally elliptical of increasing flatness, said intake valve being adapted to be reciprocated into closed and opened relationship with said outlet end of said intake passage at said intake port, said valve being disposed to have its axis inclined between 30° and 60° to said cylinder axis.

7. In the combination as defined in claim 6, said intake valve being inclined to said cylinder axis so that said valve axis makes an angle of approximately 45° therewith and passes through the center of curvature of the arcuate cross section roof of said combustion space within the limits of 15% of said cylinder bore, said valve having a semi-cylindrical shroud on its upstream face for directing the flow from the intake passage.

8. In an internal combustion engine, a cylinder with a piston operating therein, a head for said cylinder defining a combustion chamber therewith, means for introducing air into said combustion chamber and for imparting a high velocity swirl thereto, injection means positioned in said head for injecting fuel in a tangential direction into said combustion chamber and in the direction of air swirl so that an increment of injected fuel forms with a localized portion of swirling air therein a combustible fuel-air mixture, a spark ignition device mounted in said cylinder head having its electrodes projecting within said combustion chamber and downstream of said injection means so that said combustible fuel-air mixture resulting from said increment of injected fuel surrounds the spark gap between said electrodes substantially as soon as said combustible fuel-air mixture is formed, means coordinated with engine operation for controlling the start of injection of fuel from said injection means during the latter part of the compression stroke of said piston, means synchronized with the engine operation for producing a spark of igniting intensity at said gap between said electrodes at the time said combustible fuel-air mixture formed from said increment of injected fuel reaches said spark gap to initiate combustion and establish a flame front, and means for continuing the injection of fuel following ignition to impregnate shortly in advance of said flame front additional quantities of combustible mixture for burning the same substantially as rapidly as formed to provide the power required on each cycle, whereby the formation of sufficient end gases consisting of combustible fuel-air mixture trapped by the flame front to cause spontaneous ignition and produce knock is prevented, said injection means being of the type which produces a narrow angle penetrating fuel spray varying between 5° and 25°, and having its center line (under static conditions) tangent to a coaxial cylinder having a radius from 0.2 to 0.5 that of the engine cylinder bore, said spray center line intersecting an element of said coaxial cylinder at an acute angle varying from 75° to 90°, the intersection along said element measured from the crown of said piston at top dead center position being not less than 25% and not more than 75% of the distance measured along said element between the crown of said piston at top dead center position and the top of said combustion chamber, said spark gap being located in a plane normal to the center line of the fuel spray from said injection means and spaced from the orifice of said injection means not less than 0.35" and not more than 0.70", and in this plane in the direction of and parallel to the air motion in the combustion chamber at a distance of at least 0.10" and not more than 0.40" from said spray center line and at right angle to this distance and in the same plane within the limits of 0.0" to 0.25", said top of said combustion chamber being substantially arcuate in cross section with a radius of curvature varying from 40% to 65% of the cylinder bore, said means for introducing air into said combustion chamber comprising a tubular air flow passage with an outlet end ending as the intake port in said top of said chamber with its center line at the outlet end extending through said intake port and into said combustion chamber and a cross section smoothly decreasing in area in the direction of air flow while varying in shape from circular to lopsided circular to generally elliptical, a poppet valve with a semi-cylindrical shroud on its upstream face adapted to be reciprocated into closed and opened relationship with said outlet end of said intake passage at said intake port and having its axis inclined to the cylinder axis at an angle varying between 30° and 60° and passing through said radius of curvature of said top of said combustion chamber within the limits of 15% of the cylinder bore dimension, said center line of said outlet end of said intake passage being disposed at an acute angle relative to the axis of said valve at said intake port varying between 30° and 60°, the plane defined by said center line and the valve axis being substantially normal to the plane defined by said valve axis and said cylinder axis.

References Cited in the file of this patent
UNITED STATES PATENTS

| | | |
|---|---|---|
| 2,484,009 | Barber | Oct. 11, 1949 |
| 2,864,347 | Barber et al. | Dec. 16, 1958 |